United States Patent
Kato

(10) Patent No.: US 9,213,864 B2
(45) Date of Patent: Dec. 15, 2015

(54) DATA PROCESSING APPARATUS AND VALIDITY VERIFICATION METHOD

(71) Applicant: Kei Kato, Kanagawa (JP)

(72) Inventor: Kei Kato, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 555 days.

(21) Appl. No.: 13/644,059

(22) Filed: Oct. 3, 2012

(65) Prior Publication Data

US 2013/0091324 A1 Apr. 11, 2013

(30) Foreign Application Priority Data

Oct. 7, 2011 (JP) ................................. 2011-222618

(51) Int. Cl.
  G06F 12/00 (2006.01)
  G06F 21/64 (2013.01)
  G06F 12/14 (2006.01)
  G06F 12/08 (2006.01)

(52) U.S. Cl.
  CPC ............ *G06F 21/64* (2013.01); *G06F 12/1408* (2013.01); *G06F 12/1466* (2013.01); *G06F 12/00* (2013.01); *G06F 12/0804* (2013.01)

(58) Field of Classification Search
  CPC .................................. G06F 21/64; G06F 12/64
  See application file for complete search history.

(56) References Cited

U.S. PATENT DOCUMENTS

| | | | |
|---|---|---|---|
| 2005/0182952 A1 | 8/2005 | Shinozaki | |
| 2007/0083768 A1 | 4/2007 | Isogai et al. | |
| 2007/0226518 A1 | 9/2007 | Yasaki et al. | |
| 2008/0134321 A1* | 6/2008 | Rajagopal et al. | 726/21 |
| 2009/0132829 A1 | 5/2009 | Ohhashi | |
| 2013/0091394 A1* | 4/2013 | Kato | 714/719 |

FOREIGN PATENT DOCUMENTS

| | | |
|---|---|---|
| JP | 2005-227995 | 8/2005 |
| JP | 2007-133860 | 5/2007 |
| JP | 2007-257197 | 10/2007 |
| JP | 2009-129061 | 6/2009 |

\* cited by examiner

*Primary Examiner* — Reginald Bragdon
*Assistant Examiner* — Mehdi Namazi
(74) *Attorney, Agent, or Firm* — IPUSA, PLLC

(57) ABSTRACT

A data processing apparatus includes an auxiliary storage device having target verification data stored therein, a program memory having a validity verification program stored therein, a first RAM (Random Access Memory), a second RAM, and an execution unit configured to execute a validity verification process in accordance with the validity verification program stored in the program memory. The execution unit is configured to copy the target verification data from the auxiliary storage device into the first RAM, execute the validity verification process on the copied target verification data in the first RAM, and use the second RAM as a work area in a case of executing the validity verification process.

9 Claims, 11 Drawing Sheets

DATA PROCESSING APPARATUS AND VALIDITY VERIFICATION METHOD

BACKGROUND OF THE INVENTION

1. Field of the Invention

The present invention relates to a data processing apparatus and a validity verification method for maintaining security upon activation and the like.

2. Description of the Related Art

With conventional computers, server devices, and other data processing apparatuses that are attached to personal computers (PC), electronic devices, and electric devices, there is performed a process of determining whether data of, for example, a program stored in an auxiliary storage device has been tampered with or destroyed. This process, which is referred to as validity verification, is executed, for example, when the data processing apparatus is activated.

FIG. 1 is a schematic diagram illustrating a configuration of a personal computer according to a related art example. As illustrated in FIG. 1, the personal computer includes, for example, a CPU (Central Processing Unit), a boot device, an auxiliary storage device, a TPM (Trusted Platform Module), a code calculation engine, and a RAM (Random Access Memory) that are connected to each other by a bus.

The boot device is, for example, a flash ROM (Read Only Memory). The boot device stores programs (e.g., BIOS (Basic Input/Output System), a program for verifying validity) that are executed, for example, when the personal computer is activated. The auxiliary storage device is, for example, a HDD (Hard Disk Drive), a flash memory, or an EEPROM (Electrically Erasable and Programmable Read Only Memory). The auxiliary storage device stores, for example, an operating system, various application programs, and databases. The TPM is a security chip that is resistant against, for example, tampering of stored data. The TPM can store or generate, for example, key data used for code calculation and comparison data used for validity verification. The TPM can rewrite the stored/generated key data by performing predetermined procedures. The code calculation engine is a calculation unit that performs code (cipher) calculation such as RSA encryption calculation or hash calculation. The TPM may include the function(s) of the code calculation engine.

For example, in performing the validity verification using the personal computer illustrated in FIG. 1, target verification data (e.g., program, data) stored in the auxiliary storage device is copied to the RAM. Then, the code calculation engine performs code calculation on the target verification data by using key data. Then, the calculation result of code calculation by the code calculation engine is compared with comparison data. In a case where the calculation result matches the comparison data, it is determined that the target verification data is valid (normal). In the case where the target verification data is valid, the operating system of the personal computer is activated and proceeds to a normal operating status.

Various documents are disclosed in relation to the above-described technology. For example, Japanese Laid-Open Patent Application 2009-129061 describes a data processing apparatus that performs validity verification by calculating a hash value of an activation target (e.g., program) and then comparing the calculated hash value with a hash value stored beforehand.

However, with a conventional data processing apparatus, it becomes necessary to access the RAM, for example, when copying the target verification data (arrow (A) in FIG. 1), when loading a program used for validity verification (arrow (B) in FIG. 1), when reading the target verification data as a calculation object (arrow (C) in FIG. 1), and when writing various parameters in a work area (arrow (D) in FIG. 1). Further, the RAM of the conventional data processing apparatus is required to be divided (demarcated) into separate areas beforehand, such as a copy area for copying the target verification data and another being a work area for executing a program for performing code calculation. Thus, it may be necessary to rearrange (reallocate) data in the RAM after performing validity verification. The arrangement of data leads to delay of the activation of the data processing apparatus.

SUMMARY OF THE INVENTION

The present invention may provide a data processing apparatus and a validity verification method that substantially obviate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a data processing apparatus and a validity verification method particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a data processing apparatus includes: an auxiliary storage device having target verification data stored therein; a program memory having a validity verification program stored therein; a first RAM (Random Access Memory); a second RAM; and an execution unit configured to execute a validity verification process in accordance with the validity verification program stored in the program memory. The execution unit is configured to copy the target verification data from the auxiliary storage device to the first RAM, execute the validity verification process on the copied target verification data in the first RAM, and use the second RAM as a work area in a case of executing the validity verification process.

Other objects, features and advantages of the present invention will become more apparent from the following detailed description when read in conjunction with the accompanying drawings.

DETAILED DESCRIPTION OF THE PREFERRED EMBODIMENTS

In the following, embodiments of the present invention will be described with reference to the accompanying drawings.
<First Embodiment>
[Configuration]

Figure 1:
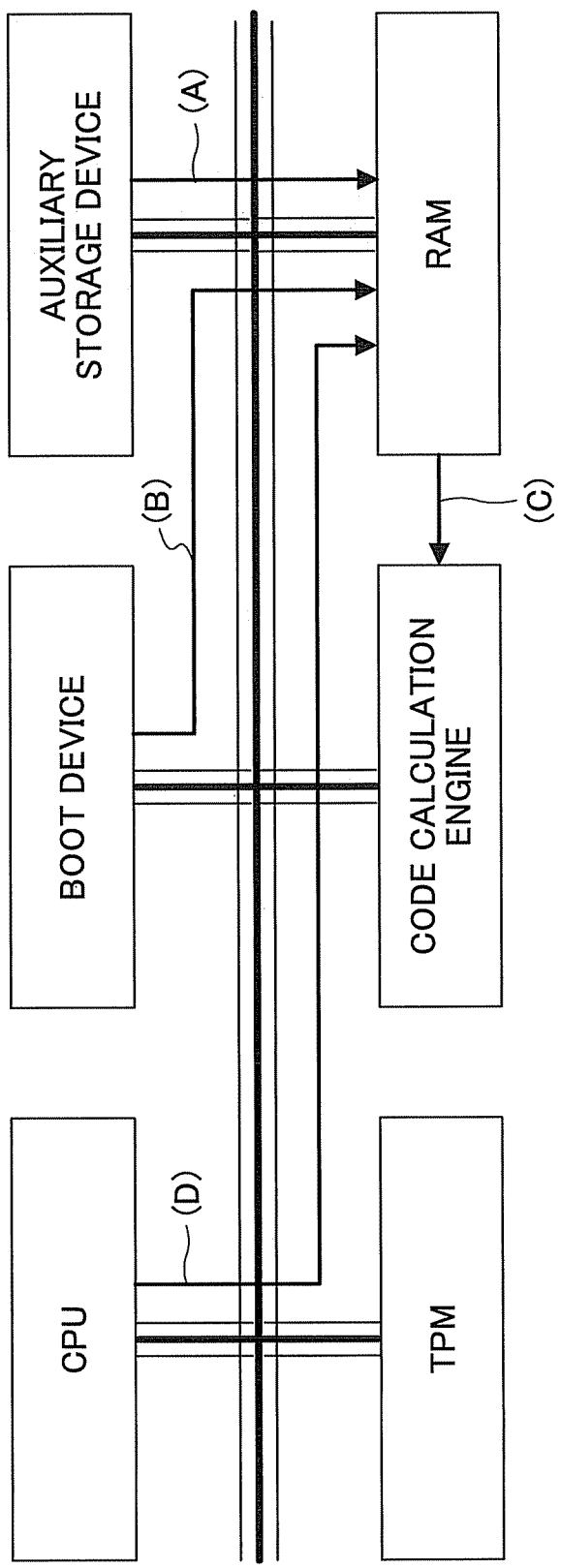
FIG. 1 is a schematic diagram illustrating a configuration of a personal computer according to a related art example.
Figure 2:
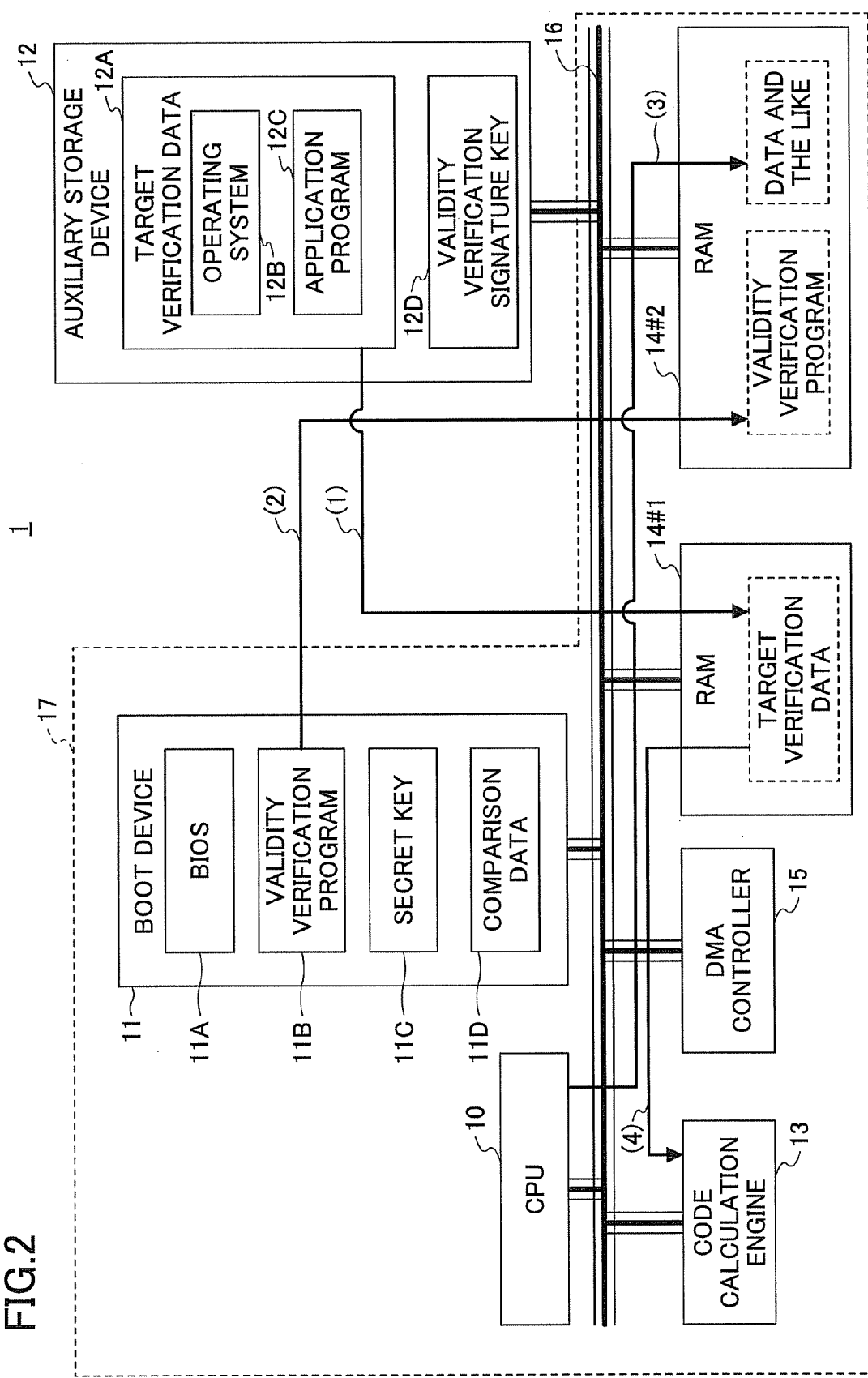
FIG. 2 is an example illustrating a system configuration of a data processing apparatus according to a first embodiment of the present invention.

FIG. 2 is an example illustrating a system configuration of a data processing apparatus 1 according to a first embodiment of the present invention. The data processing apparatus 1 includes, for example, a CPU (Central Processing Unit) 10, a boot device 11, an auxiliary storage device 12, a code calculation engine 13, a RAM (Random Access Memory) 14#1, a RAM 14#2, and a DMA (Direct Memory Access) controller 15 that are connected by a bus 16.

Among the elements of the data processing apparatus 1, it is preferable for the CPU 10, the boot device 11, the code calculation engine 13, the RAM 14#1, the RAM 14#2, and the DMA controller 15 to be configured as an SoC (System-on-a-Chip) 17. Accordingly, the entire chip area of the data processing apparatus 1 and the size of the data processing apparatus 1 can be reduced. In view of the large demands for size reduction, this advantage is particularly significant in a case where the data processing apparatus 1 is a built-in type computer built into an electronic device or an electric device. Alternatively, the data processing apparatus 1 may use an ASIC (Application Specific Integrated Circuit) instead of the SoC 17.

The data processing apparatus 1 may also include other elements/components of a typical data processing apparatus such as a display device, a speaker, a mouse, a keyboard, a touchpad, and/or an interface for connecting to a network (same for the below-described data processing apparatuses 2, 3, 4, 5 according to the second-fifth embodiments and modified examples of the present invention).

The CPU 10 is a processor including, for example, a program counter, an instruction decoder, various computing units (operators), an LSU (Load Storage Unit), and a general-purpose register. The CPU 10 may be used as an execution unit for executing various processes including the validity verification process in accordance with, for example, a program stored in the boot device 11.

The boot device 11 is, for example, a mask ROM (Read Only Memory) having data and programs such as a BIOS (Basic Input Output System) 11A, a validity verification program 11B, a secret key 11C, and comparison data 11D stored therein. The data and programs stored in the boot device 11 are excluded from the target verification data because the boot device 11 is a storage device that cannot rewrite data and programs. Alternatively, the locations in which the secret key 11C and the comparison data 11D are stored may be, for example, a ROM that is separate from the boot device 11.

The auxiliary storage device 12 is a non-volatile memory such as a HDD (Hard Disk Drive), a flash memory, or an EEPROM (Electrically Erasable Programmable Read Only Memory). The auxiliary storage device 12 has, for example, target verification data 12A and a validity verification signature key (signature key used for validity verification) 12D stored therein. The target verification data 12A includes, for example, an operating system 12B and an application program 12C. Alternatively, the validity verification signature key 12D may be stored in a storage device other than the auxiliary storage device 12.

The code calculation engine 13 is a computing unit for performing code calculation such as RSA code calculation or hash calculation. The code calculation of the code calculation engine 13 is performed by using the secret key 11C and the validity verification signature key 12D. The code calculation engine 13 may also be used as a part of the execution unit for executing the validity verification process in accordance with, for example, a program stored in the boot device 11.

The RAM 14#1 and the RAM 14#2 are separate RAMs in which the input/output ports of the RAMs are different from each other. In a case of performing validity verification, the target verification data 12A is copied to the RAM 14#1 (arrow (1) of FIG. 2). Further, in a case of performing validity verification, a part of or the entire validity verification program 11B is loaded in the RAM 14#2 (arrow (2) of FIG. 2), so that the RAM 14#2 is used as a work area for performing validity verification (arrow (3) of FIG. 2).

Accordingly, the RAM 14#1 and the RAM 14#2 are used for separate purposes (functions) in which the RAM 14#1 is used for having the target verification data 12A copied thereto, and the RAM 14#2 is used for having a part of or the entire validity verification program loaded thereto and being used as a work area. Thereby, access to the RAM 14#1 and access to the RAM 14#2 is controlled so that they can be prevented from interfering with each other in a case of performing validity verification. As a result, validity verification can be performed more rapidly.

The DMA controller 15 controls data transfer between the devices/components connected to the bus 16 in accordance with instructions from the CPU 10.

[Procedure of Validity Verification]

The data processing apparatus 1 according to an embodiment of the present invention performs validity verification when, for example, the data processing apparatus 1 is activated (including when power of the data processing apparatus 1 is turned on, when the data processing apparatus 1 is restarted). In this embodiment, the validity verification performed by the data processing apparatus 1 is for verifying whether the target verification data 12A has been, for example, tampered with or destroyed. There is no specific condition (restriction) regarding the timing for performing the validity verification. Thus, the timing for performing the validity verification may be decided arbitrarily. Next, the procedure of validity verification according to an embodiment of the present invention is described.

Figure 3:
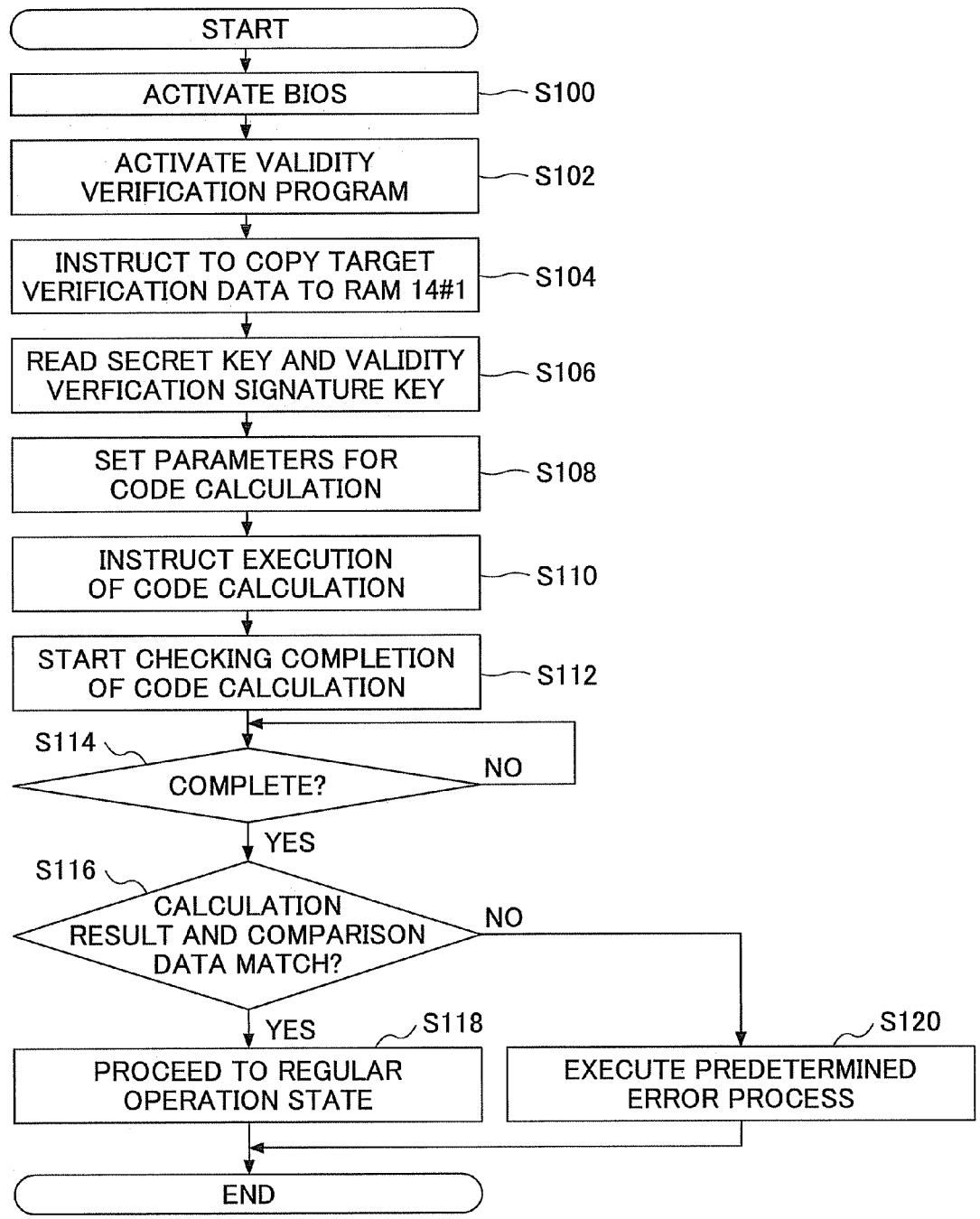
FIG. 3 is a flowchart illustrating the flow of an operation performed in a case of activating the data processing apparatus according to the first embodiment of the present invention.

FIG. 3 is a flowchart illustrating the flow of an operation performed in a case of activating the data processing apparatus 1 according to an embodiment of the present invention.

First, the BIOS 11A is activated when the data processing apparatus 1 is activated (Step S100).

Then, the validity verification program 11B is activated (Step S102). For example, a top (header) part of the validity verification program 11B is executed in the boot device 11 and the remaining part of the validity verification program 11B is loaded and executed in the RAM 14#2. A process of loading the part of the validity verification program 11B may be performed by the DMA controller 15 or by the CPU 10.

The validity verification program 11B instructs the DMA controller 15 to copy the target verification data 12A into the RAM#1 (Step S104). The DMA controller 15 copies the target verification data 12A to a predetermined area in the RAM 14#1.

Then, the validity verification program 11B reads the secret key 11C and the validity verification signature key 12D (Step S106). Then, the validity verification program 11B combines the secret key 11C and the validity verification signature key 12D and sets parameters for code calculation (Step S108). Then, the validity verification program 11B instructs the code calculation engine 13 to calculate, for example, a hash value corresponding to the target verification data 12A in accordance with the parameters set in Step S108 (Step S110). The validity verification signature key 12D is preferred to be, for example, data that is less than 300 bytes. In a case where the validity verification signature key 12D is less than 300 bytes, the time for reading the validity verification signature key 12D from the auxiliary storage device 12 can be reduced. The code calculation engine 13 reads the target verification data 12A stored in the RAM 14#1 in accordance with instructions from the validity verification program 11B and performs code calculation on the target verification data 12A (arrow (4) in FIG. 2).

After instructing calculation of, for example, the hash value, the validity verification program 11B starts a process of periodically checking whether the code calculation is completed (Step S112).

Then, in a case where the calculation by the code calculation engine 13 is completed (Yes in Step S114), the validity verification program 11B determines whether the calculation result of the code calculation engine 13 and the comparison data 11D match (Step S116).

In a case where the calculation result of the code calculation engine 13 and the comparison data 11D match (Yes in Step S116), the data processing apparatus 1 shifts (proceeds) to a regular operation state (Step S118). In this step of shifting to the regular operation state, the target verification data 12A loaded to the RAM 14#1 is a copy which is the same as the target verification data 12A initially stored in the auxiliary storage device 12, and other programs and data are controlled to be prevented (restricted) from being written to the RAM 14#1 in the case of performing validity verification. As a result, there is no need to perform, for example, rearrangement of the operating system 12B and the application program 12C included in the target verification data 12A in the RAM 14#1. Thus, the operating system 12B and the application program 12C included in the target verification data 12A are loaded as they are (i.e. without being rearranged) in the RAM 14#1 and executed in the RAM 14#1. Accordingly, the time for activating the data processing apparatus 1 can be reduced.

In a case where the calculation result of the code calculation engine 13 and the comparison data 11D do not match (No in Step S116), a predetermined error process is executed (Step S120). The predetermined error process is not limited to a particular error process. For example, the predetermined error process may include a process selected from a recovery program list by the user. Accordingly, by executing the predetermined error process, the data processing apparatus 1 is prevented from proceeding to a regular operation state in a case where there is a possibility of, for example, tampering with or damaging of the target verification data 12A. Thereby, unauthorized operation of the data processing apparatus 1 can be prevented.

With the data processing apparatus 1 according to the above-described embodiment of the present invention, interference of access (to the RAM) can be prevented in a case of performing validity verification because the RAM 14#1 (into which the target verification data 12A is copied) and the RAM 14#2 (in which a part of or all of the validity verification program is loaded and used as a work area) are used separately. Thereby, validity verification can be rapidly performed with the data processing apparatus 1 according to the above-described embodiment of the present invention.

In addition, the operating system 12B and the application program 12C included in the target verification data 12A can be executed in the RAM 14#1 because the RAM 14#1 is solely used as a copy area of the target verification data 12A (in which a copy of the target verification data 12A is stored in the RAM 14#1).

<Second Embodiment>

Next, a data processing apparatus 2 according to a second embodiment of the present invention is described with reference to the drawings.

[Configuration]

Figure 4:
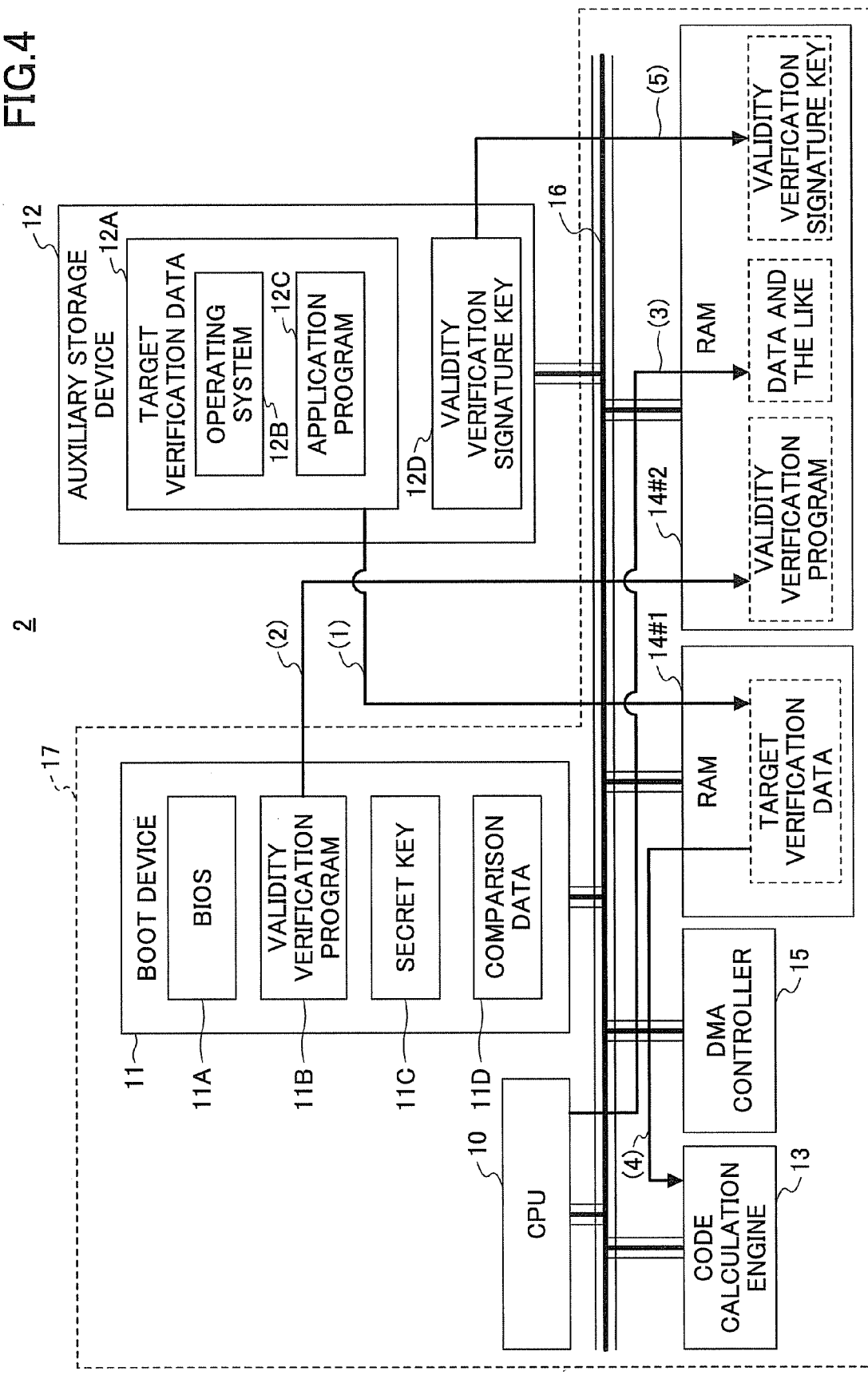
FIG. 4 is an example illustrating a system configuration of a data processing apparatus according to a second embodiment of the present invention.

FIG. 4 is an example illustrating a system configuration of the data processing apparatus 2 according to the second embodiment of the present invention. In the data processing apparatus 2 of the second embodiment, like components/elements are denoted by like reference numerals as those of the data processing apparatus 1 of the first embodiment and are not further explained.

The data processing apparatus 2 is different from the data processing apparatus 1 in that the validity verification signature key 12D is copied into the RAM 14#2 (arrow (5) in FIG. 4), so that the copy of the validity verification signature key 12D is used by being read from the RAM 14#2 when performing code calculation. Thereby, in a case where the size of the data of the validity verification signature key 12D is relatively large, validity verification can be performed more rapidly compared to the data processing apparatus 1.

[Procedure of Validity Verification]

Figure 5:
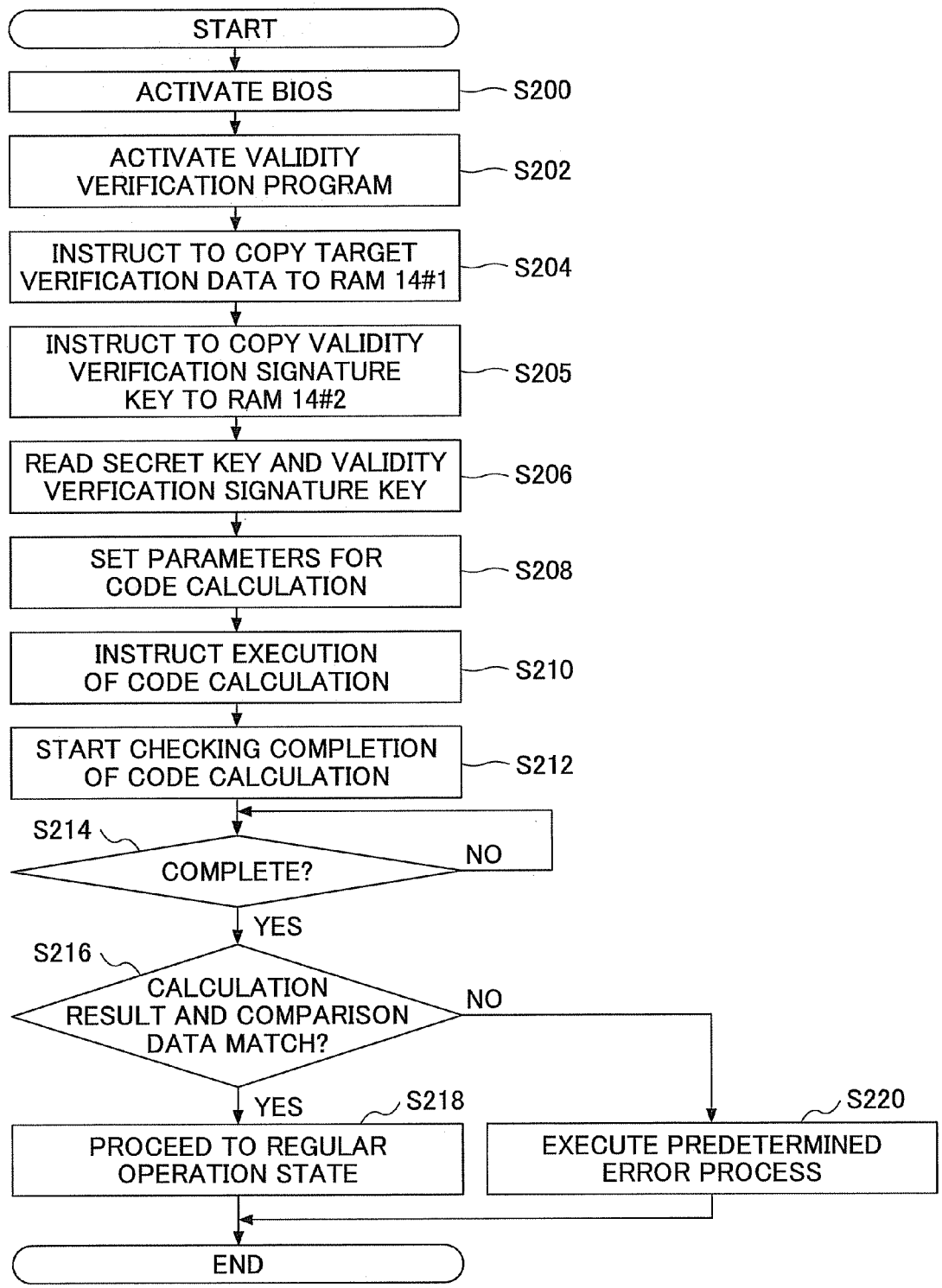
FIG. 5 is a flowchart illustrating the flow of an operation performed in a case of activating the data processing apparatus according to the second embodiment of the present invention.

FIG. 5 is a flowchart illustrating the flow of an operation performed in a case of activating the data processing apparatus 2 according to an embodiment of the present invention.

First, the BIOS 11A is activated when the data processing apparatus 2 is activated (Step S200).

Then, the validity verification program 11B is activated (Step S202). For example, a top (header) part of the validity verification program 11B is executed in the boot device 11 and the remaining part of the validity verification program 11B is loaded and executed in the RAM 14#2. A process of loading the part of the validity verification program 11B may be performed by the DMA controller 15 or by the CPU 10.

The validity verification program 11B instructs the DMA controller 15 to copy the target verification data 12A into the RAM 14#1 (Step S204).

Then, the validity verification program 11B instructs the DMA controller 15 to copy the validity verification signature key 12D into the RAM 14#2 (Step S205). Alternatively, Step S205 may be performed before Step S204. That is, the order in which Steps S204 and S205 are performed is not limited to the order of the flowchart of FIG. 5.

Then, the DMA controller 15 copies the target verification data 12A into a predetermined area in the RAM 14#1. Further, the DMA controller 15 copies the validity verification signature data 12D into a predetermined area in the RAM 14#2.

Then, the validity verification program 11B reads the secret key 11C and the validity verification signature key 12D (Step S206). Then, the validity verification program 11B combines the secret key 11C and the validity verification signature key 12D and sets parameters for code calculation (Step S208). Then, the validity verification program 11B instructs the code calculation engine 13 to calculate, for example, a hash value corresponding to the target verification data 12A in accordance with the parameters set in Step S208 (Step S210). The validity verification signature key 12D is preferred to be, for example, data that is less than 300 bytes. In a case where the validity verification signature key 12D is less than 300 bytes, the time for reading the validity verification signature key 12D from the auxiliary storage device 12 can be reduced.

After instructing calculation of, for example, the hash value, the validity verification program 11B starts a process of periodically checking whether the code calculation is completed (Step S212).

Then, in a case where the calculation by the code calculation engine 13 is completed (Yes in Step S214), the validity verification program 11B determines whether the calculation result of the code calculation engine 13 and the comparison data 11D match (Step S216).

In a case where the calculation result of the code calculation engine 13 and the comparison data 11D match (Yes in Step S216), the data processing apparatus 2 shifts (proceeds) to a regular operation state (Step S218). In this step of shifting to the regular operation state, the target verification data 12A loaded in the RAM 14#1 is a copy which is the same as the target verification data 12A initially stored in the auxiliary storage device 12, and other programs and data are controlled to be prevented (restricted) from being written to the RAM 14#1 in the case of performing validity verification. As a result, there is no need to perform, for example, rearrangement of the operating system 12B and the application program 12C included in the target verification data 12A in the RAM 14#1. Thus, the operating system 12B and the application program 12C included in the target verification data 12A are loaded as they are (i.e. without being rearranged) in the RAM 14#1 and executed in the RAM 14#1. Accordingly, the time for activating the data processing apparatus 2 can be reduced.

Further, because the validity verification program copied into the RAM 14#2 and data or the like loaded and used in the RAM 14#2 as their work area are no longer necessary once the data processing apparatus 2 has shifted to the regular operation state, the RAM 14#2 can be freely overwritten. Accordingly, there is also no need to perform, for example, rearrangement of data in the RAM 14#2. Thus, the time for activating the data processing apparatus 2 can be further reduced.

In a case where the calculation result of the code calculation engine 13 and the comparison data 11D do not match (No in Step S216), a predetermined error process is executed (Step S220). The predetermined error process is not limited to a particular error process. For example, the predetermined error process may include a process selected from a recovery program list by the user. Accordingly, by executing the predetermined error process, the data processing apparatus 2 is prevented from proceeding to a regular operation state in a case where there is a possibility of, for example, tampering with or damaging of the target verification data 12A. Thereby, unauthorized operation of the data processing apparatus 2 can be prevented.

Hence, the data processing apparatus 2 according to the above-described embodiment of the present invention can attain the same advantages as those of the data processing apparatus 1. In addition, the data processing apparatus 2 according to the above-described embodiment of the present invention can rapidly perform validity verification even in a case where the size of the data of the validity verification signature key 12D is relatively large.

Although only the validity verification signature key 12D is copied into the RAM 14#2, the secret key 11C and the comparison data 11D may also be copied into the RAM 14#2 at the timing of, for example, Step S205 in FIG. 5.

<Third Embodiment>

Next, a data processing apparatus 3 according to a third embodiment of the present invention is described with reference to the drawings.

[Configuration]

Figure 6:
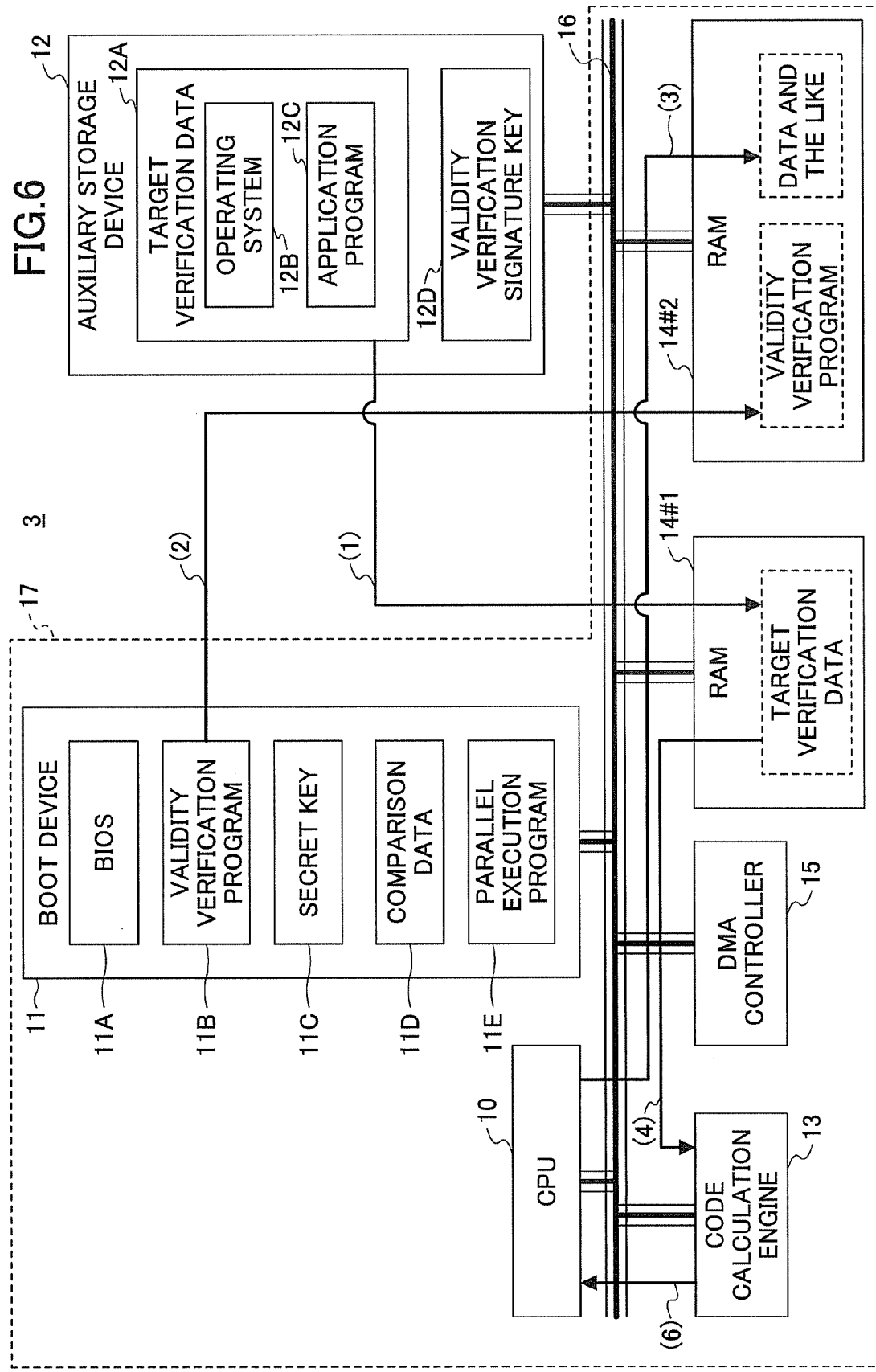
FIG. 6 is an example illustrating a system configuration of a data processing apparatus according to a third embodiment of the present invention.

FIG. 6 is an example illustrating a system configuration of the data processing apparatus 3 according to the third embodiment of the present invention. In the data processing apparatus 3 of the third embodiment, like components/elements are denoted by like reference numerals as those of the data processing apparatus 1 of the first embodiment and are not further explained.

The data processing apparatus 3 is different from the data processing apparatus 1 in that the boot device 11 has a parallel execution program 11E stored therein (alternatively, the parallel execution program 11E may be stored in the auxiliary storage device 12). The parallel execution program 11E is a program that is used to, for example, initialize a hardware device. The parallel execution program 11E is required to be executed when activating the data processing apparatus 3.

The code calculation engine 13 according to the third embodiment has a function of reporting interruption (interruption notice). For example, when the code calculation engine 13 completes a code calculation process, the code calculation engine 13 reports the completion of calculation to the CPU 10 (or to the validity verification program 11B in a case of software) (arrow (6) of FIG. 6).

Accordingly, after the CPU 10 instructs the code calculation engine 13 to perform code calculation, the CPU 10 can execute the parallel execution program 11E until receiving the interruption notice (in this case, a notice reporting completion of calculation by the code calculation engine 13). That is, the CPU 10 can execute the parallel execution program 11E during a period between instructing the code calculation engine 13 to perform code calculation and receiving the calculation completion notice from the code calculation engine 13.

[Procedure of Validity Verification]

Figure 7:
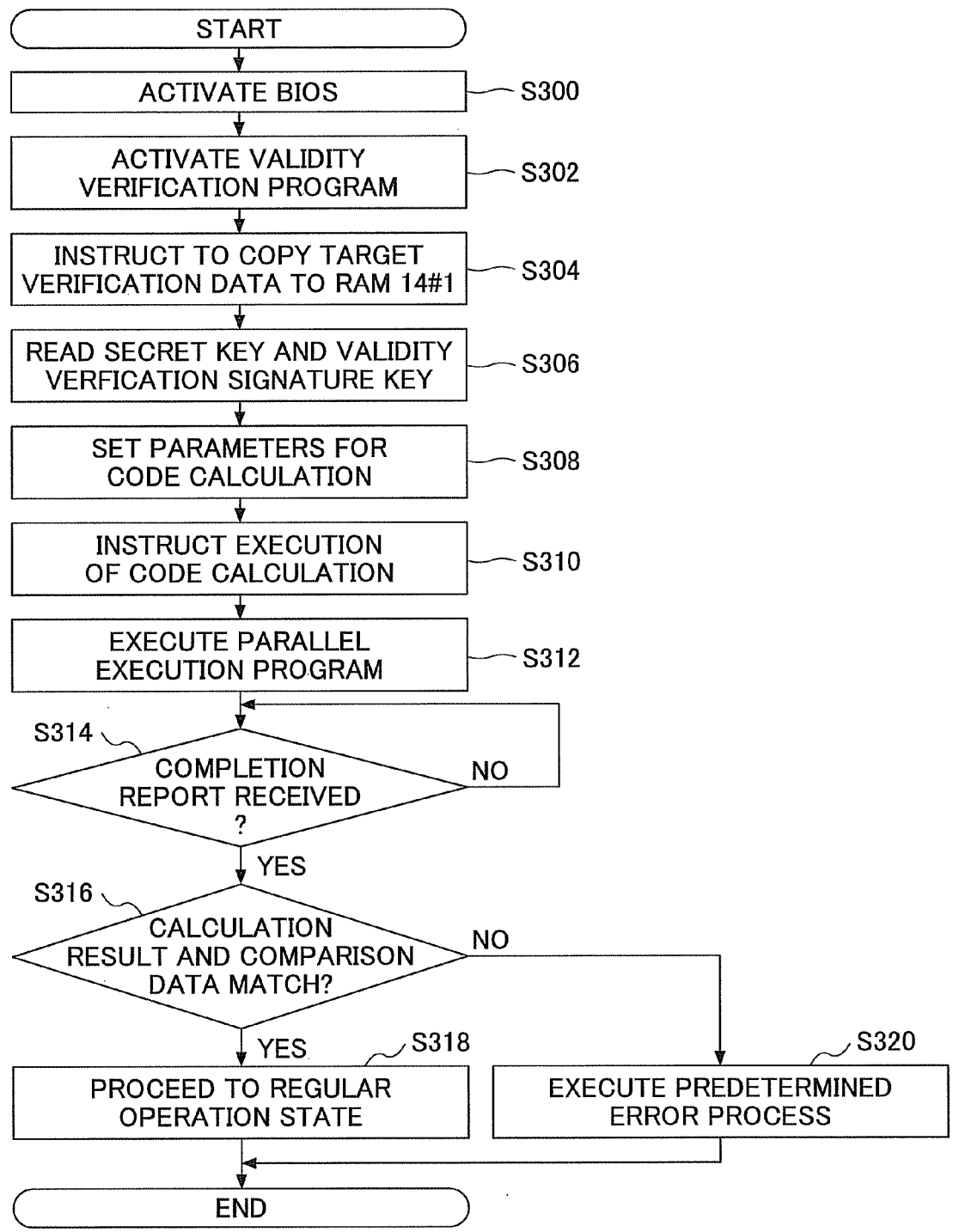
FIG. 7 is a flowchart illustrating the flow of an operation performed in a case of activating the data processing apparatus according to the third embodiment of the present invention.

FIG. 7 is a flowchart illustrating the flow of an operation performed in a case of activating the data processing apparatus 3 according to an embodiment of the present invention.

First, the BIOS 11A is activated when the data processing apparatus 3 is activated (Step S300).

Then, the validity verification program 11B is activated (Step S302). For example, a top (header) part of the validity verification program 11B is executed in the boot device 11 and the remaining part of the validity verification program 11B is loaded and executed in the RAM 14#2. A process of loading the part of the validity verification program 11B may be performed by the DMA controller 15 or by the CPU 10.

The validity verification program 11B instructs the DMA controller 15 to copy the target verification data 12A into the RAM 14#1 (Step S304). Accordingly, the DMA controller 15 copies the target verification data 12A into a predetermined area in the RAM 14#1.

Then, the validity verification program 11B reads the secret key 11C and the validity verification signature key 12D (Step S306). Then, the validity verification program 11B combines the secret key 11C and the validity verification signature key 12D and sets parameters for code calculation (Step S308). Then, the validity verification program 11B instructs the code calculation engine 13 to calculate, for example, a hash value corresponding to the target verification data 12A in accordance with the parameters set in Step S308 (Step S310). The validity verification signature key 12D is preferred to be, for example, data that is less than 300 bytes. In a case where the validity verification signature key 12D is less than 300 bytes, the time for reading the validity verification signature key 12D from the auxiliary storage device 12 can be reduced.

When the validity verification program 11B instructs the code calculation engine 13 to perform code calculation, the CPU 10 executes a parallel execution program (Step S312). The trigger for starting the execution of the parallel execution program may be written in the validity verification program 11B or a superordinate program. Further, the process of loading the parallel execution program 11E in the RAM 14#2 may be performed by the DMA controller 15 or by the CPU 5.

When the validity verification program 11B (or CPU 5) receives a notice indicating that calculation of, for example, a hash value is completed (Step S314), the validity verification program 11B (or the CPU 5) determines whether the calculation result of the code calculation engine 13 and the comparison data 11D match (Step S316).

In a case where the calculation result of the code calculation engine 13 and the comparison data 11D match (Yes in Step S316), the data processing apparatus 3 shifts (proceeds) to a regular operation state (Step S318). In this step of shifting to the regular operation state, the target verification data 12A loaded in the RAM 14#1 is a copy which is the same as the target verification data 12A initially stored in the auxiliary storage device 12, and other programs and data are controlled to be prevented (restricted) from being written to the RAM 14#1 in the case of performing validity verification. As a result, there is no need to perform, for example, rearrangement of the operating system 12B and the application program 12C included in the target verification data 12A in the RAM 14#1. Thus, the operating system 12B and the application program 12C included in the target verification data 12A are loaded as they are (i.e. without being rearranged) in the RAM 14#1 and executed in the RAM 14#1. Accordingly, the time for activating the data processing apparatus 3 can be reduced.

Further, because the validity verification program copied into the RAM 14#2 and data or the like loaded and used in the RAM 14#2 as their work area are no longer necessary once the data processing apparatus 3 has shifted to the regular operation state, the RAM 14#2 can be freely overwritten. Accordingly, there is also no need to perform, for example, rearrangement of data in the RAM 14#2. Thus, the time for activating the data processing apparatus 3 can be further reduced.

In a case where the calculation result of the code calculation engine 13 and the comparison data 11D do not match (No in Step S316), a predetermined error process is executed (Step S320). The predetermined error process is not limited to a particular error process. For example, the predetermined error process may include a process selected from a recovery program list by the user. Accordingly, by executing the predetermined error process, the data processing apparatus 3 is prevented from proceeding to a regular operation state in a case where there is a possibility of, for example, tampering with or damaging of the target verification data 12A. Thereby, unauthorized operation of the data processing apparatus 3 can be prevented.

Hence, the data processing apparatus 3 according to the above-described embodiment of the present invention can attain the same advantages as those of the data processing apparatus 1. In addition, the data processing apparatus 3 according to the above-described embodiment of the present invention can rapidly perform validity verification because the parallel execution program 11E can be executed during a period between instructing the code calculation engine 13 to perform code calculation and receiving the calculation completion notice from the code calculation engine 13.

<Fourth Embodiment>

Next, a data processing apparatus 4 according to a fourth embodiment of the present invention is described with reference to the drawings.

[Configuration]

Figure 8:
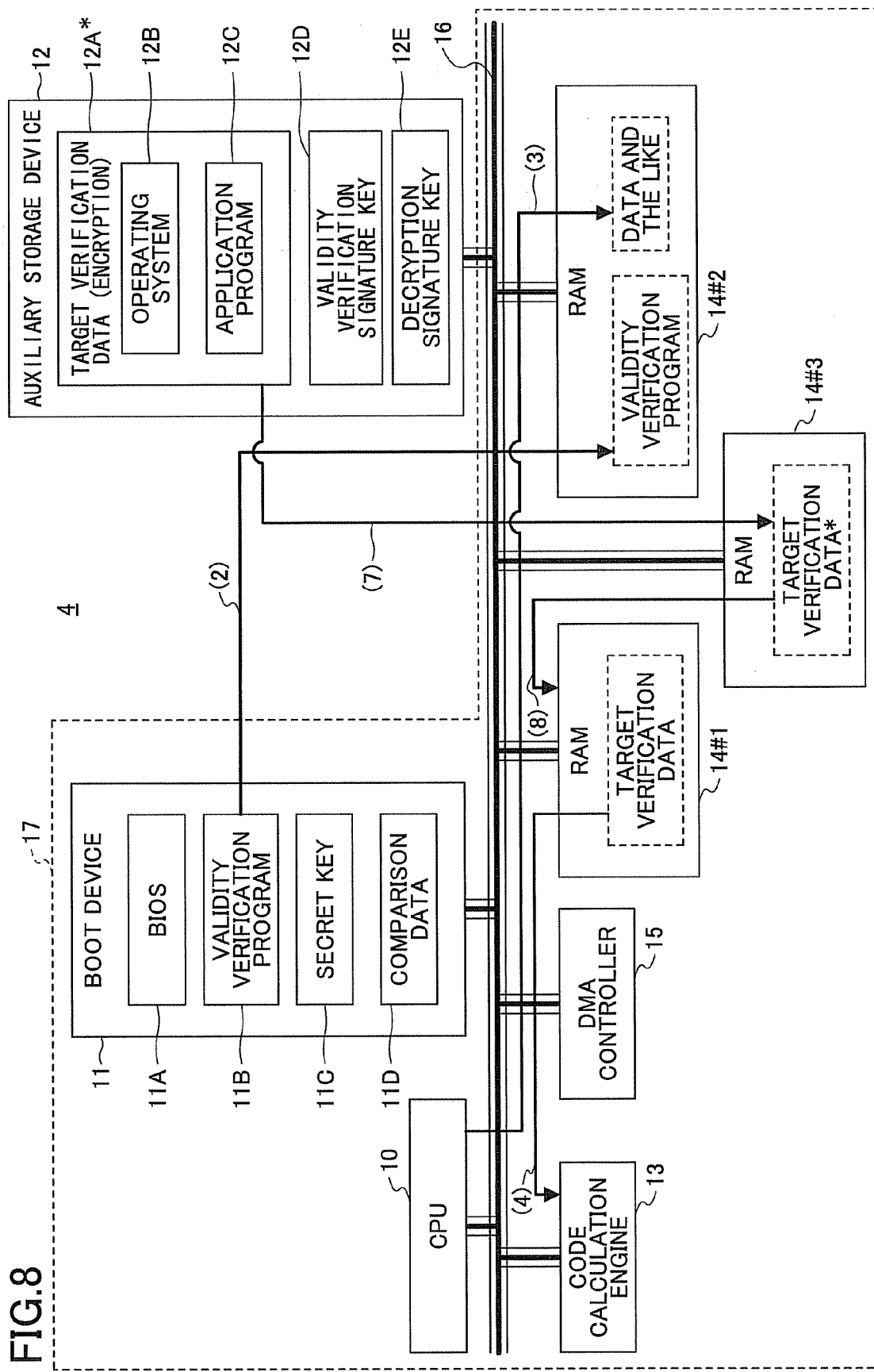
FIG. 8 is an example illustrating a system configuration of a data processing apparatus according to a fourth embodiment of the present invention.

FIG. 8 is an example illustrating a system configuration of the data processing apparatus 4 according to the fourth embodiment of the present invention. In the data processing apparatus 4 of the fourth embodiment, like components/elements are denoted by like reference numerals as those of the data processing apparatus 1 of the first embodiment and are not further explained.

The data processing apparatus 4 is different from the data processing apparatus 1 in that a RAM 14#3 is included in the data processing apparatus 4.

Further, the data processing apparatus 4 is also different from the data processing apparatus 1 in that a decryption signature key 12E is stored in the auxiliary storage device 12. A target verification data 12A* stored in the auxiliary storage device 12 is encrypted (encoded) in a manner that can be decrypted (decoded) by using the decryption signature key 12E. It is to be noted that the asterisk "*" indicates that the data is encrypted.

The encrypted target verification data 12A* is copied into the RAM 14#3 (arrow (7) in FIG. 8). The decryption of the encrypted target verification data 12A* is performed by, for example, the code calculation engine 13. The target verification data 12A decrypted by the code calculation engine 13 is stored in the RAM 14#1 (arrow (8) in FIG. 8).

Thereby, it becomes difficult for malicious software and the like to tamper with or destroy the target verification data 12A. Thus, security of the data processing apparatus 4 can be improved.

[Procedure of Validity Verification]

Figure 9:
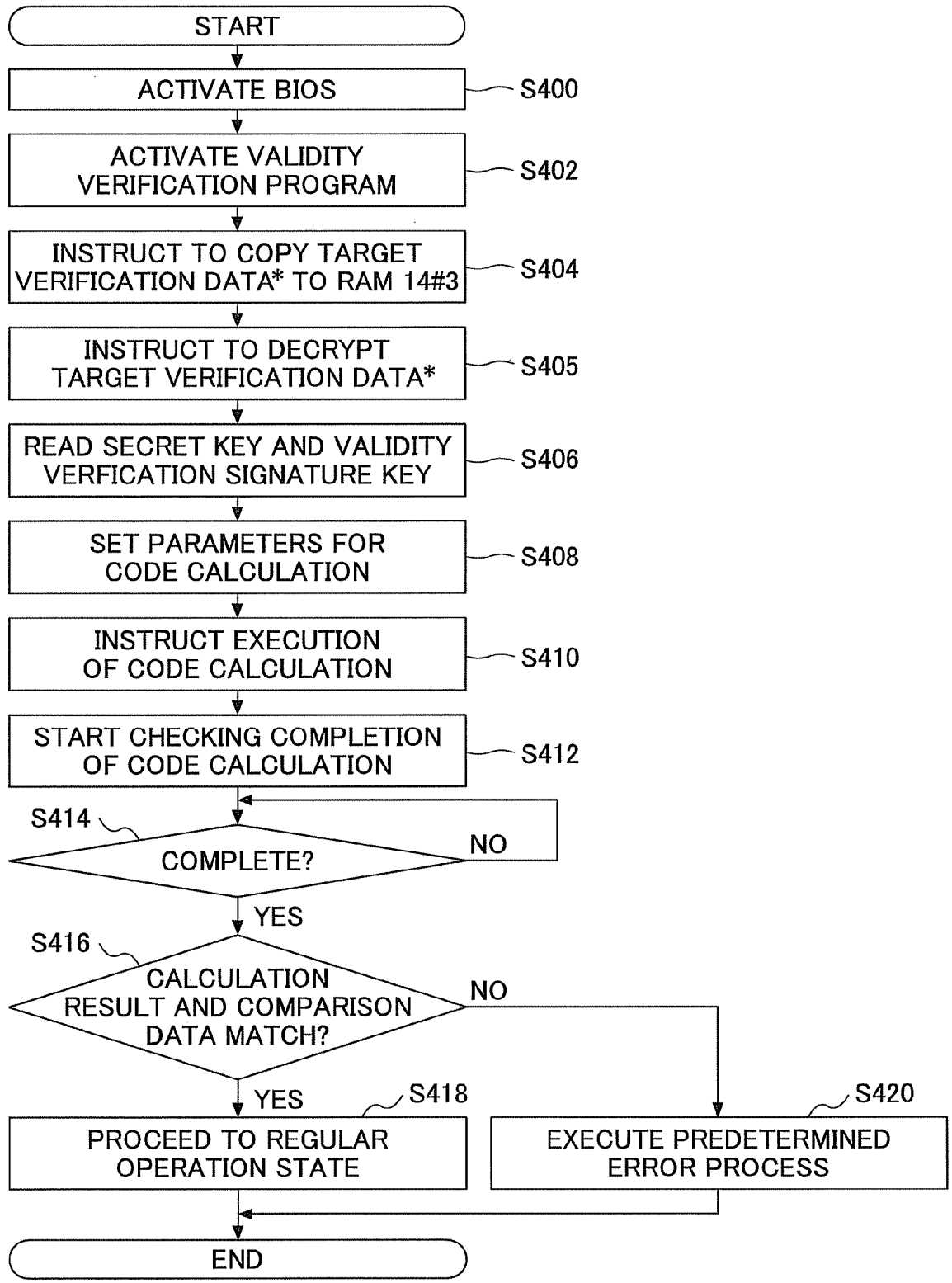
FIG. 9 is a flowchart illustrating the flow of an operation performed in a case of activating the data processing apparatus according to the fourth embodiment of the present invention.

FIG. 9 is a flowchart illustrating the flow of an operation performed in a case of activating the data processing apparatus 4 according to an embodiment of the present invention.

First, the BIOS 11A is activated when the data processing apparatus 4 is activated (Step S400).

Then, the validity verification program 11B is activated (Step S402). For example, a top (header) part of the validity verification program 11B is executed in the boot device 11 and the remaining part of the validity verification program 11B is loaded and executed in the RAM 14#2. A process of loading the part of the validity verification program 11B may be performed by the DMA controller 15 or by the CPU 10.

The validity verification program 11B instructs the DMA controller 15 to copy the target verification data 12A* into the RAM 14#3 (Step S404). Accordingly, the DMA controller 15 copies the target verification data 12A* into a predetermined area in the RAM 14#3.

Then, the validity verification program 11B instructs the code calculation engine 13 to decrypt the target verification data 12A* by using the decryption signature key 12E (Step S405). The target verification data 12A decrypted by the code calculation engine 13 is stored in the RAM 14#1.

Then, the validity verification program 11B reads the secret key 11C and the validity verification signature key 12D (Step S406). Then, the validity verification program 11B combines the secret key 11C and the validity verification signature key 12D and sets parameters for code calculation (Step S408). Then, the validity verification program 11B instructs the code calculation engine 13 to calculate, for example, a hash value corresponding to the target verification data 12A in accordance with the parameters set in Step S408 (Step S410). The validity verification signature key 12D is preferred to be, for example, data that is less than 300 bytes. In a case where the validity verification signature key 12D is less than 300 bytes, the time for reading the validity verification signature key 12D from the auxiliary storage device 12 can be reduced.

After instructing calculation of, for example, the hash value, the validity verification program 11B starts a process of periodically checking whether the code calculation is completed (Step S412).

Then, in a case where the calculation by the code calculation engine 13 is completed (Yes in Step S414), the validity verification program 11B determines whether the calculation result of the code calculation engine 13 and the comparison data 11D match (Step S416).

In a case where the calculation result of the code calculation engine 13 and the comparison data 11D match (Yes in Step S416), the data processing apparatus 4 shifts (proceeds) to a regular operation state (Step S418). In this step of shifting to the regular operation state, the target verification data 12A loaded in the RAM 14#1 is a copy which is the same as the target verification data 12A initially stored in the auxiliary storage device 12, and other programs and data are controlled to be prevented (restricted) from being written to the RAM 14#1 in the case of performing validity verification. As a result, there is no need to perform, for example, rearrangement of the operating system 12B and the application program 12C included in the target verification data 12A in the RAM 14#1. Thus, the operating system 12B and the application program 12C included in the target verification data 12A are loaded as they are (i.e. without being rearranged) in the RAM 14#1 and executed in the RAM 14#1. Accordingly, the time for activating the data processing apparatus 4 can be reduced.

Further, because the validity verification program copied into the RAM 14#2 and data or the like loaded and used in the RAM 14#2 as their work area are no longer necessary once the data processing apparatus 4 has shifted to the regular operation state, the RAM 14#2 can be freely overwritten. Accordingly, there is also no need to perform, for example, rearrangement of data in the RAM 14#2. Thus, the time for activating the data processing apparatus 4 can be further reduced.

In a case where the calculation result of the code calculation engine 13 and the comparison data 11D do not match (No in Step S416), a predetermined error process is executed (Step S420). The predetermined error process is not limited to a particular error process. For example, the predetermined error process may include a process selected from a recovery program list by the user. Accordingly, by executing the predetermined error process, the data processing apparatus 4 is prevented from proceeding to a regular operation state in a case where there is a possibility of, for example, tampering with or damaging of the target verification data 12A. Thereby, unauthorized operation of the data processing apparatus 4 can be prevented.

Hence, the data processing apparatus 4 according to the above-described embodiment of the present invention can attain the same advantages as those of the data processing apparatus 1. In addition, the data processing apparatus 4 according to the above-described embodiment of the present invention can attain high security because the target verification data 12A* stored in the auxiliary storage device 12 is encrypted.

Although the RAM 14#2 and the RAM 14#3 are separately provided in the data processing apparatus 4 in the above-described embodiment, the data processing apparatus 4 may have a single RAM in which the RAM 14#2 and the RAM 14#3 are provided in separate areas of the single RAM.

<Fifth Embodiment>

Next, a data processing apparatus 5 according to a fifth embodiment of the present invention is described with reference to the drawings.

[Configuration]

Figure 10:
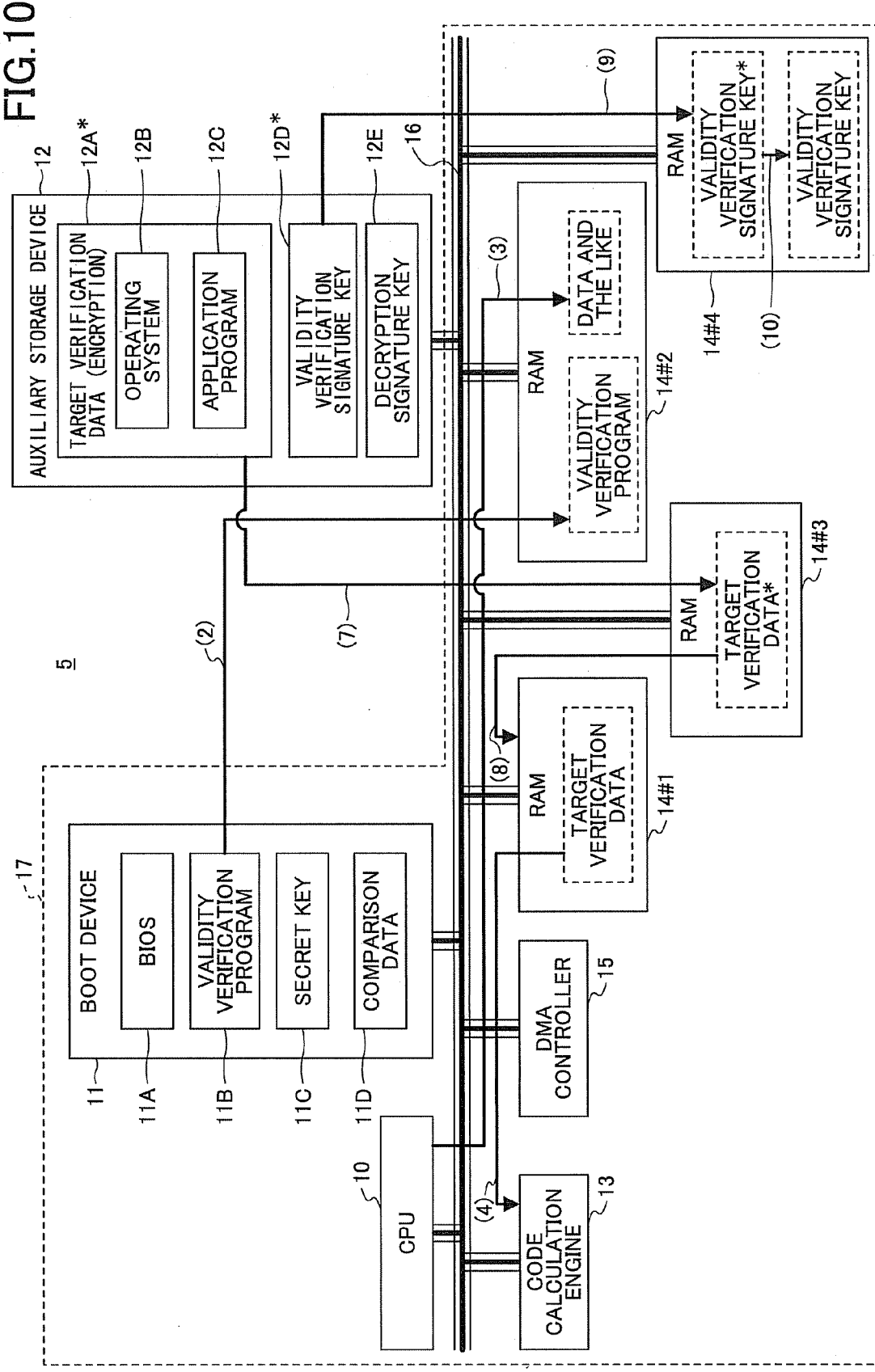
FIG. 10 is an example illustrating a system configuration of a data processing apparatus according to a fifth embodiment of the present invention.

FIG. 10 is an example illustrating a system configuration of the data processing apparatus 5 according to the fifth embodiment of the present invention. In the data processing apparatus 5 of the fourth embodiment, like components/elements are denoted by like reference numerals as those of the data processing apparatus 4 of the fourth embodiment and are not further explained.

The data processing apparatus 5 is different from the data processing apparatus 4 in that a RAM 14#4 is included in the data processing apparatus 5.

Further, the data processing apparatus 5 is also different from the data processing apparatus 4 in that a validity verification signature key 12D* is stored in the auxiliary storage device 12 in addition to the target verification data 12A*. The validity verification signature key 12D* is also encrypted (encoded) in a manner that can be decrypted (decoded) by using the decryption signature key 12E.

The encrypted validity verification signature key 12D* is copied into the RAM 14#4 (arrow (9) in FIG. 10). The decryption of the encrypted validity verification signature key 12D* is performed by, for example, the code calculation engine 13. The validity verification signature key 12D decrypted by the code calculation engine 13 is stored in an area in the RAM 14#4 other than the area to which the encrypted validity verification signature key 12D* has been copied (arrow (10) in FIG. 10).

Thereby, it becomes difficult for malicious software and the like to tamper with or destroy the target verification data 12A. Thus, security of the data processing apparatus 5 can be further improved.

[Procedure of Validity Verification]

Figure 11:
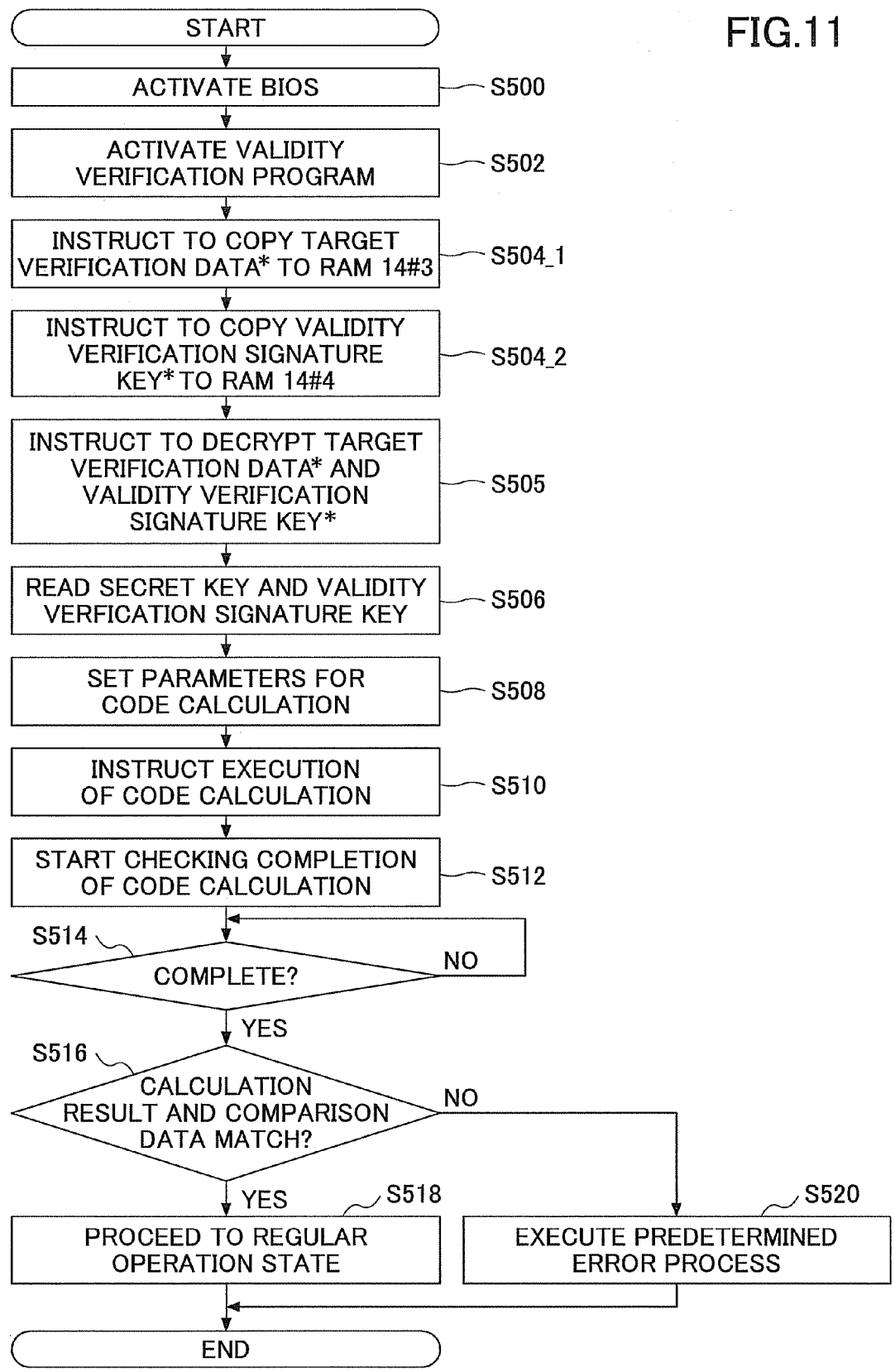
FIG. 11 is a flowchart illustrating the flow of an operation performed in a case of activating the data processing apparatus according to the fifth embodiment of the present invention.

FIG. 11 is a flowchart illustrating the flow of an operation performed in a case of activating the data processing apparatus 5 according to an embodiment of the present invention.

First, the BIOS 11A is activated when the data processing apparatus 5 is activated (Step S500).

Then, the validity verification program 11B is activated (Step S502). For example, a top (header) part of the validity verification program 11B is executed in the boot device 11 and the remaining part of the validity verification program 11B is loaded and held for execution in the RAM 14#2. A process of loading the part of the validity verification program 11B may be performed by the DMA controller 15 or by the CPU 10.

The validity verification program 11B instructs the DMA controller 15 to copy the target verification data 12A* into the RAM 14#3 (Step S504_1). Then, the validity verification program 11B instructs the DMA controller 15 to copy the validity verification signature key 12D* into the RAM 14#4 (Step S504_2). Accordingly, the DMA controller 15 copies the target verification data 12A* to a predetermined area in the RAM 14#3 and copies the validity verification signature key 12D* into the RAM 14#4.

Then, the validity verification program 11B instructs the code calculation engine 13 to decrypt the target verification data 12A* and the validity verification signature key 12D* by using the decryption signature key 12E (Step S505). The target verification data 12A decrypted by the code calculation engine 13 is stored in the RAM 14#1. The validity verification signature key 12D decrypted by the code calculation engine 13 is stored in the RAM 14#2.

Then, the validity verification program 11B reads the secret key 11C and the validity verification signature key 12D (Step S506). Then, the validity verification program 11B combines the secret key 11C and the validity verification signature key 12D and sets parameters for code calculation (Step S508). Then, the validity verification program 11B instructs the code calculation engine 13 to calculate, for example, a hash value corresponding to the target verification data 12A in accordance with the parameters set in Step S508 (Step S510). The validity verification signature key 12D is preferred to be, for example, data that is less than 300 bytes. In a case where the validity verification signature key 12D is less than 300 bytes, the time for reading the validity verification signature key 12D from the auxiliary storage device 12 can be reduced.

After instructing calculation of, for example, the hash value, the validity verification program 11B starts a process of periodically checking whether the code calculation is completed (Step S512).

Then, in a case where the calculation by the code calculation engine 13 is completed (Yes in Step S514), the validity verification program 11B determines whether the calculation result of the code calculation engine 13 and the comparison data 11D match (Step S516).

In a case where the calculation result of the code calculation engine 13 and the comparison data 11D match (Yes in Step S516), the data processing apparatus 5 shifts (proceeds) to a regular operation state (Step S518). In this step of shifting to the regular operation state, the target verification data 12A loaded to the RAM 14#1 is a copy which is the same as the target verification data 12A initially stored in the auxiliary storage device 12, and other programs and data are controlled to be prevented (restricted) from being written to the RAM 14#1 in the case of performing validity verification. As a result, there is no need to perform, for example, rearrangement of the operating system 12B and the application program 12C included in the target verification data 12A in the RAM 14#1. Thus, the operating system 12B and the application program 12C included in the target verification data 12A are loaded as they are (i.e. without being rearranged) in the RAM 14#1 and executed in the RAM 14#1. Accordingly, the time for activating the data processing apparatus 5 can be reduced.

Further, because the validity verification program copied into the RAM 14#2 and data or the like loaded and used in the RAM 14#2 as their work area are no longer necessary once the data processing apparatus 5 has shifted to the regular operation state, the RAM 14#2 can be freely overwritten. Accordingly, there is also no need to perform, for example, rearrangement of data in the RAM 14#2. Thus, the time for activating the data processing apparatus 5 can be further reduced.

In a case where the calculation result of the code calculation engine 13 and the comparison data 11D do not match (No in Step S516), predetermined error process is executed (Step S520). The predetermined error process is not limited to a particular error process. For example, the predetermined error process may include a process selected from a recovery program list by the user. Accordingly, by executing the predetermined error process, the data processing apparatus 5 is prevented from proceeding to a regular operation state in a case where there is a possibility of, for example, tampering with or damaging of the target verification data 12A. Thereby, unauthorized operation of the data processing apparatus 5 can be prevented.

Hence, the data processing apparatus 5 according to the above-described embodiment of the present invention can attain the same advantages as those of the data processing apparatus 1. In addition, the data processing apparatus 5 according to the above-described embodiment of the present invention can attain high security because the target verification data 12A* and the validity verification signature key 12D* stored in the auxiliary storage device 12 are encrypted.

Although the RAM 14#2, the RAM 14#3, and the RAM 14#4 are separately provided in the data processing apparatus 5 in the above-described embodiment, the data processing apparatus 5 may have a single RAM in which the RAM 14#2, the RAM 14#3, and the RAM 14#4 are provided in separate areas of the single RAM.

<Modified Examples>

The present invention is not limited to the specifically disclosed embodiments, and variations and modifications may be made without departing from the scope of the present invention.

For example, the data processing apparatus 4 of the fourth embodiment may be configured to have the validity verification program 11B (or the CPU 5) receive an interruption notice from the code calculation engine 13 as described in the third embodiment.

Alternatively, although separate RAMs 14#1 and 14#2 (each of the RAMs 14#1, 14#2 having separate input/output ports) are provided in the above-described embodiments of the data processing apparatuses 1-5, a RAM having multiple input/output ports and separate areas may be used to enable parallel access to the separate areas.

Except for the third embodiment, the code calculation engine 13 may be omitted from any one of the data processing apparatuses 1, 2, 4, 5 and replaced with the CPU 10 for performing code calculation.

Alternatively, the DMA controller 15 may be omitted from any one of the data processing apparatuses 1-5. In this case, the CPU 10 may execute a data copying process by way of an accumulator and the like.

The present application is based on Japanese Priority Application No. 2011-222618 filed on Oct. 7, 2011 with the Japanese Patent Office, the entire contents of which are hereby incorporated herein by reference.

What is claimed is:

1. A data processing apparatus comprising:
   an auxiliary storage device having target verification data stored therein;
   a program memory having a validity verification program stored therein;
   a first RAM (Random Access Memory);
   a second RAM;
   a third RAM; and
   an execution unit configured to execute a validity verification process in accordance with the validity verification program stored in the program memory;

wherein the execution unit is configured to copy the target verification data from the auxiliary storage device to the first RAM, execute the validity verification process on the copied target verification data in the first RAM, and use the second RAM as a work area when executing the validity verification process, wherein the target verification data stored in the auxiliary storage device is encrypted, wherein the execution unit is configured to copy the encrypted target verification data from the auxiliary storage device into the third RAM, wherein the execution unit includes a decrypting part configured to decrypt the encrypted target verification data, and wherein after the encrypted target verification data is decrypted by the decrypting part, the execution unit is configured to copy the decrypted target verification data into the first RAM.

2. The data processing apparatus as claimed in claim 1, wherein at least a part of the validity verification program is loaded in the second RAM when executing the validity verification process.

3. The data processing apparatus as claimed in claim 1, wherein each of the first RAM and the second RAM has an input port and an output port.

4. The data processing apparatus as claimed in claim 1, wherein the execution unit includes a code calculation part configured to perform code calculation on the copied target verification data in the first RAM, wherein at least a part of key data used for performing the code calculation is copied from the auxiliary storage device into the second RAM when executing the validity verification process, wherein the execution unit is configured to use the copied part of the key data when executing the validity verification process.

5. The data processing apparatus as claimed in claim 1, wherein the execution unit includes a CPU (Central Processing Unit) and a code calculation part, wherein the code calculation part is configured to perform code calculation on the copied target verification data in the first RAM and report completion of the code calculation to the CPU when the code calculation is completed.

6. The data processing apparatus as claimed in claim 1, further comprising:

a fourth RAM:

wherein the execution unit includes a code calculation part configured to perform code calculation on the copied target verification data in the first RAM, wherein at least a part of key data used for performing the code calculation is encrypted and stored in the auxiliary storage device, wherein the execution unit is configured to copy the encrypted part of the key data from the auxiliary storage device into the fourth RAM, wherein the execution unit includes a decrypting part configured to decrypt the encrypted part of the key data, wherein after the encrypted part of the key data is decrypted by the decrypting part, the code calculation part is configured to use the decrypted part of the key data.

7. The data processing apparatus as claimed in claim 1, wherein the execution unit includes a DMA (Direct Memory Access) controller configured to control data transfer at least between the auxiliary storage device and the first RAM, wherein the DMA controller is configured to control copying of the target verification data from the auxiliary storage device into the first RAM.

8. The data processing apparatus as claimed in claim 1, wherein the program memory includes a ROM (Read Only Memory), wherein the first RAM, the second RAM, and the execution unit constitute a configuration of a SoC (System-on-a-Chip) or a configuration of a ASIC (Application Specific Integrated Circuit).

9. A data processing method comprising:

copying target verification data from an auxiliary storage device of a data processing apparatus into a first RAM of the data processing apparatus;

executing a validity verification process on the copied target verification data in the first RAM in accordance with a validity verification program stored in a program memory of the data processing apparatus;

using a second RAM as a work area when executing the validity verification process;

encrypting the target verification data stored in the auxiliary storage device, copying the encrypted target verification data from the auxiliary storage device into a third RAM;

decrypting the encrypted target verification data; and after the encrypted target verification data is decrypted, copying the decrypted target verification data into the first RAM.

* * * * *